US010050506B2

(12) United States Patent  
Jeong et al.

(10) Patent No.: US 10,050,506 B2  
(45) Date of Patent: Aug. 14, 2018

(54) LINEAR COMPRESSOR

(71) Applicant: LG ELECTRONICS INC., Seoul (KR)

(72) Inventors: Sangsub Jeong, Seoul (KR); Jehoon Kim, Seoul (KR); Ochang Gwon, Seoul (KR)

(73) Assignee: LG Electronics Inc., Seoul (KR)

( * ) Notice: Subject to any disclaimer, the term of this patent is extended or adjusted under 35 U.S.C. 154(b) by 452 days.

(21) Appl. No.: 14/812,244

(22) Filed: Jul. 29, 2015

(65) Prior Publication Data

US 2016/0056699 A1 Feb. 25, 2016

(30) Foreign Application Priority Data

Aug. 25, 2014 (KR) .................. 10-2014-0110638

(51) Int. Cl.
| | |
|---|---|
| *H02K 1/02* | (2006.01) |
| *H02K 1/34* | (2006.01) |
| *H02K 3/38* | (2006.01) |
| *H02K 33/16* | (2006.01) |
| *F04B 35/04* | (2006.01) |
| *F04B 39/12* | (2006.01) |

(Continued)

(52) U.S. Cl.
CPC ............. *H02K 33/16* (2013.01); *F04B 35/04* (2013.01); *F04B 35/045* (2013.01); *F04B 39/121* (2013.01); *F04B 39/122* (2013.01); *F04B 53/14* (2013.01); *H02K 1/34* (2013.01); *H02K 3/38* (2013.01); *H02K 7/14* (2013.01)

(58) Field of Classification Search  
CPC .. H02K 1/02; H02K 1/34; H02K 3/38; H02K 33/16

USPC ...................................................... 310/15, 71  
See application file for complete search history.

(56) References Cited

U.S. PATENT DOCUMENTS

| | | |
|---|---|---|
| 6,741,008 B2 | 5/2004 | Jeon et al. |
| 6,800,973 B2 | 10/2004 | Futami et al. |

(Continued)

FOREIGN PATENT DOCUMENTS

| | | |
|---|---|---|
| CN | 1444791 A | 9/2003 |
| CN | 1728516 A | 2/2006 |

(Continued)

OTHER PUBLICATIONS

International Search Report in International Application No. PCT/KR2015/008077, dated Oct. 26, 2015, 3 pages.

(Continued)

*Primary Examiner* — John K Kim  
(74) *Attorney, Agent, or Firm* — Fish & Richardson P.C.

(57) ABSTRACT

Provided is a linear compressor. The linear compressor includes a cylinder defining a compression space for a refrigerant, a piston reciprocated in an axis direction within the cylinder, and a linear motor providing power to the piston. The linear motor includes an inner stator disposed outside the cylinder, the inner stator including a center core and a side core disposed on at least one side of the center core, an outer stator disposed to be spaced outward from the inner stator in a radius direction, and a magnet movably disposed in an airgap defined between the inner stator and the outer stator. The side core includes a core body and a lead-out guide device coupled to the core body to expose or lead out a power line to the outside of the side core.

18 Claims, 13 Drawing Sheets

(51) Int. Cl.
  *F04B 53/14* (2006.01)
  *H02K 7/14* (2006.01)

(56) References Cited

U.S. PATENT DOCUMENTS

| | | | |
|---|---|---|---|
| 7,075,199 B2 | 7/2006 | Kang et al. | |
| 2002/0153782 A1 | 10/2002 | Kang | |
| 2003/0020344 A1 | 1/2003 | Futami | |
| 2003/0102725 A1* | 6/2003 | Jeon | .................. H02K 1/145 |
| | | | 310/15 |
| 2003/0102763 A1 | 6/2003 | Park | |
| 2006/0017332 A1 | 1/2006 | Kang | |
| 2006/0261681 A1* | 11/2006 | Choi | .................. F04B 35/045 |
| | | | 310/15 |
| 2010/0310393 A1 | 12/2010 | Lee | |
| 2013/0038164 A1* | 2/2013 | Liu | .................. H01F 7/021 |
| | | | 310/156.38 |
| 2016/0056699 A1* | 2/2016 | Jeong | .................. F04B 35/045 |
| | | | 417/416 |

FOREIGN PATENT DOCUMENTS

| | | |
|---|---|---|
| CN | 1866696 A | 11/2006 |
| EP | 2719896 A | 4/2014 |
| KR | 2000039163 A | 7/2000 |
| KR | 10-0595728 | 7/2006 |
| KR | 712914 A | 5/2007 |
| KR | 2013004424 A | 1/2013 |
| KR | 20-0470694 | 1/2014 |

OTHER PUBLICATIONS

Chinese Office Action in Chinese Application No. 201580042778.1, dated Feb. 11, 2018, 16 pages.
Extended European Search Report in European Application No. 15836191.5, dated Feb. 27, 2018, 13 pages.

* cited by examiner

LINEAR COMPRESSOR

CROSS-REFERENCE TO RELATED APPLICATIONS

The present application claims priority under 35 U.S.C. 119 and 35 U.S.C. 365 to Korean Patent Application No. 10-2014-0110638 (filed on Aug. 25, 2014), which is hereby incorporated by reference in its entirety.

BACKGROUND

The present disclosure relates to a linear compressor.

In general, compressors are machines that receive power from a power generation device such as an electric motor or turbine to compress air, a refrigerant, or various working gases, thereby increasing in pressure. Compressors are being widely used in home appliances such as refrigerators or air conditioners or industrial fields.

Compressors may be largely classified into reciprocating compressors in which a compression space into/from which a working gas is suctioned and discharged is defined between a piston and a cylinder to allow the piston to be linearly reciprocated into the cylinder, thereby compressing a refrigerant, rotary compressors in which a compression space into/from which a working gas is suctioned or discharged is defined between a roller that eccentrically rotates and a cylinder to allow the roller to eccentrically rotate along an inner wall of the cylinder, thereby compressing a refrigerant, and scroll compressors in which a compression space into/from which is suctioned or discharged is defined between an orbiting scroll and a fixed scroll to compress a refrigerant while the orbiting scroll rotates along the fixed scroll.

In recent years, a linear compressor which is directly connected to a driving motor, in which a position is linearly reciprocated, to improve compression efficiency without mechanical losses due to movement conversion and has a simple structure is being widely developed.

The linear compressor may suction and compress a refrigerant while a piston is linearly reciprocated in a sealed shell by a linear motor and then discharge the refrigerant.

The linear motor is configured to allow a permanent magnet to be disposed between an inner stator and an outer stator. The permanent magnet may be linearly reciprocated by an electromagnetic force between the permanent magnet and the inner (or outer) stator. Also, since the permanent magnet operates in the state where the permanent magnet is connected to the piston, the permanent magnet may suction and compress the refrigerant while being linearly reciprocated within the cylinder and then discharge the refrigerant.

FIGS. 1 and 2 are views illustrating a portion of a linear motor according to the related art.

Referring to FIG. 1, a linear motor according to the related art includes an inner stator 7 disposed inside a center or central line C1 of the linear motor 1, an outer stator 2 disposed outside the inner stator 7, and a permanent magnet 6 movably disposed between the inner stator 7 and the outer stator 2.

The outer stator 2 may be a first stator device for generating a flux by using applied power, and the inner stator 7 may be a second stator device that receives the flux generated in the outer stator 2. A type in which the first stator device is disposed outside the second stator device may be called an "outer winding type".

In detail, the outer stator 2 includes a plurality of core blocks 3 and coil assemblies 4 and 5 coupled to the plurality of core blocks 3. The coil assemblies 4 and 5 include a bobbin 4 and a coil 5 wound around the bobbin 4.

As illustrated in FIG. 2, the plurality of core blocks 3 are spaced apart from each other to surround at least a portion of the coil assemblies 4 and 5.

The coil assemblies 4 and 5 include a power line 9 connected to the coil 5 and a terminal part 8 for guiding the power line 9 so that the power line 9 is led out or exposed to the outside of the outer stator 2.

The terminal part 8 and the power line 9 may be disposed between one core block and the other core block of the plurality of core blocks 3.

In the linear motor according to the related art, a distance R from the center C1 of the linear motor 1 to the permanent magnet 6 is short. Thus, an amount of flux generated in the motor may be relatively less.

To increase the flux, a linear motor for increasing the distance R is being continuously developed. Also, in the development of the linear motor, a change in structure of the guide for leading out the power line to the outside of the motor has to be considered.

SUMMARY

Embodiments provide a linear compressor including a linear motor to which an improved lead-out guide device for a power line is applied.

In one embodiment, a linear compressor includes: a cylinder defining a compression space for a refrigerant; a piston reciprocated in an axis direction within the cylinder; and a linear motor providing power to the piston, wherein the linear motor includes: an inner stator disposed outside the cylinder, the inner stator including a center core and a side core disposed on at least one side of the center core; an outer stator disposed to be spaced outward from the inner stator in a radius direction; and a permanent magnet movably disposed in an airgap defined between the inner stator and the outer stator, wherein the side core includes: a core body; and a lead-out guide device coupled to the core body to expose or lead out a power line to the outside of the side core.

The side core may further include: a plurality of core plates that are stacked on each other; and a side fixing member for fixing the plurality of core plates.

The lead-out guide device may include: a guide body inserted into the core body; and a seat part defined in the guide body and on which the side fixing member is seated.

One surface of the guide body may be recessed to form the seat part.

The inner stator may further include: a bobbin including a terminal part; and a coil wound around the bobbin, wherein at least a portion of the coil may be coupled to the terminal part to constitute the power line.

The lead-out guide device may further include a guide body including a terminal insertion part into which the terminal part is inserted.

At least a portion of the guide body may be penetrated to form the terminal insertion part.

The lead-out guide device may be provided in plurality.

The terminal part of the bobbin may include: first and second terminal parts each of which is inserted into one lead-out guide device of the plurality of lead-out guide device; and a third terminal part inserted into the other lead-out guide device.

The first and second terminal parts may be disposed on one surface of the bobbin, and the third terminal part may be disposed on a side opposite to the first and second terminal parts on the one surface of the bobbin.

The center core may be inserted into the bobbin.

The side core may include: a first side core coupled to one side of the center core; and a second side core coupled to the other side of the center core, the second side core being spaced apart form the first side core.

The terminal part of the bobbin may protrude toward the first side core, and the lead-out guide device is disposed on the first side core.

The lead-out guide device may include a magnetic body manufactured by using power metallurgy or powder sintering.

Pure iron powder that is insulation-applied may be compressed to form the magnetic body.

The lead-out guide device may be formed of a nonconductive material.

The power line may be coated with an insulation material.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
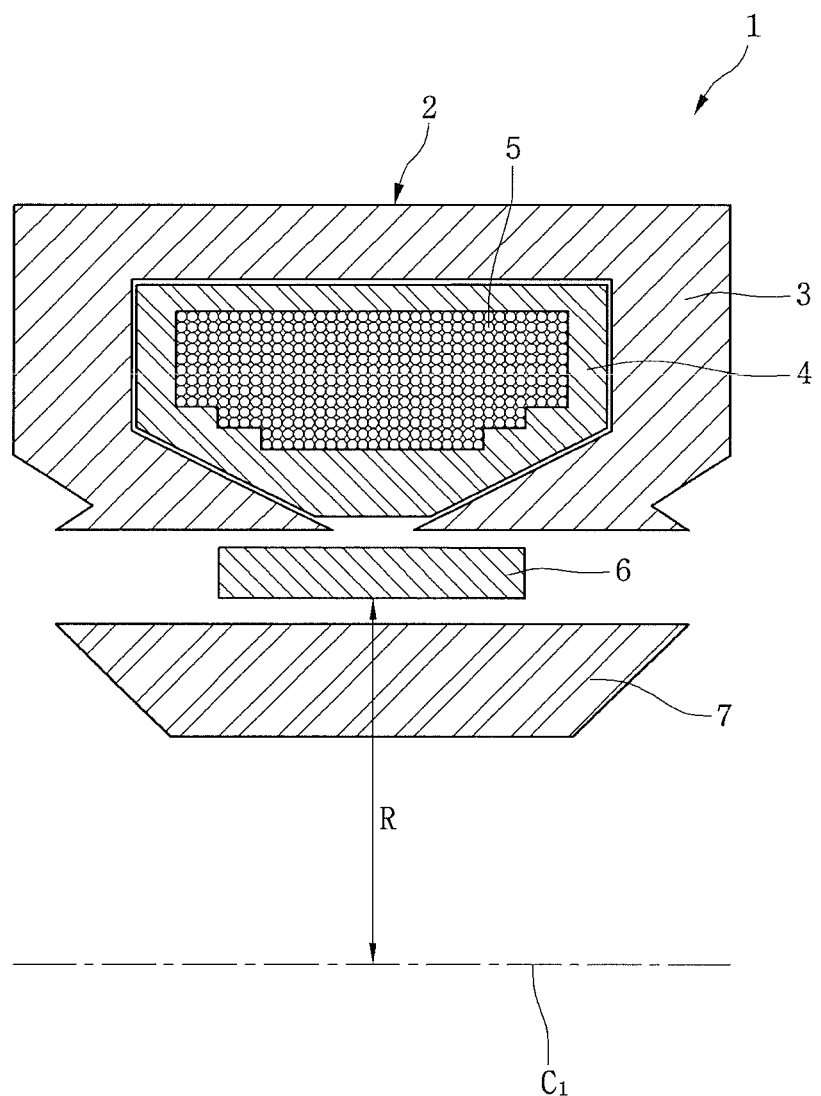
FIGS. 1 and 2 are views illustrating a portion of a linear motor provided in a linear compressor according to a related art.
Figure 2:
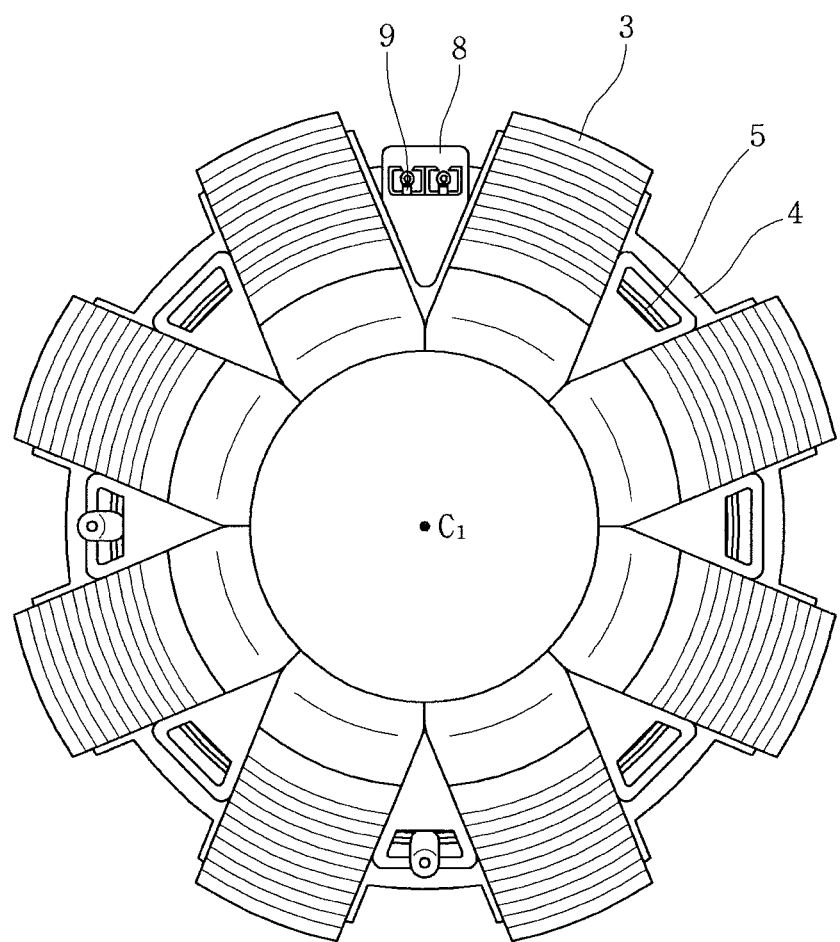
Figure 3:
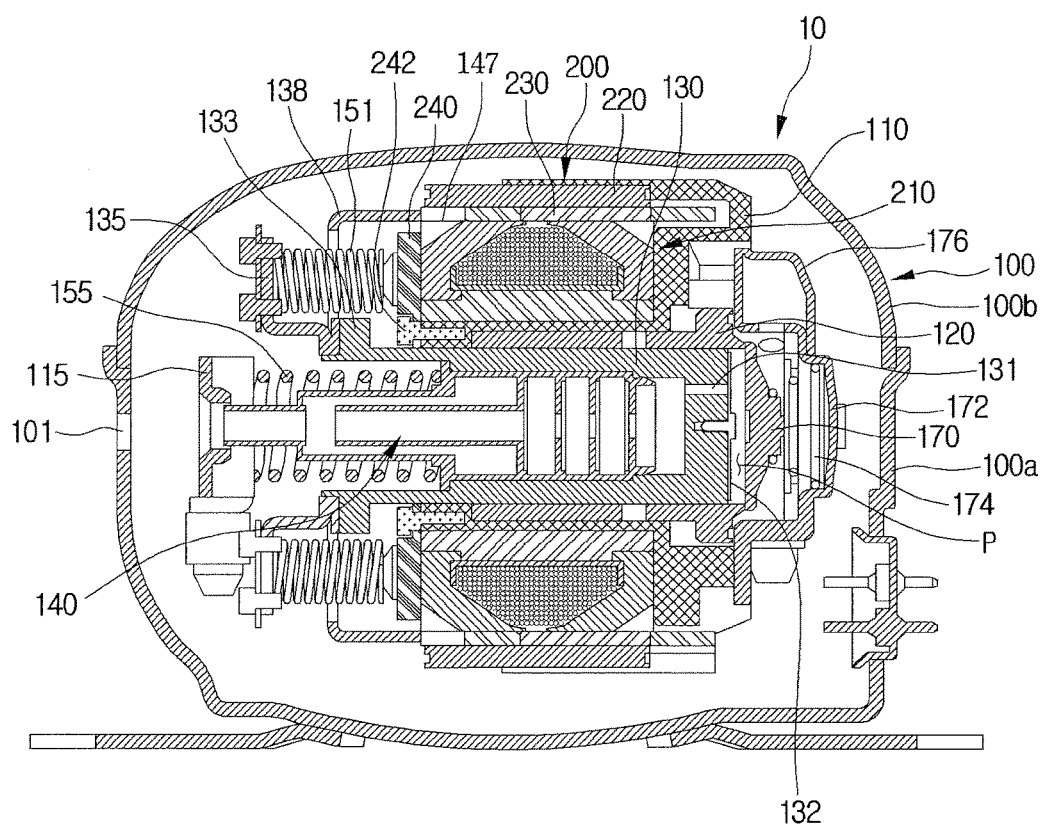
FIG. 3 is a cross-sectional view of a linear compressor according to a first embodiment.

FIG. 3 is a cross-sectional view of a linear compressor according to a first embodiment.

Referring to FIG. 3, a linear compressor 10 according to the first embodiment includes a cylinder 120 provided in the shell 100, a piston 130 that is linearly reciprocated within the cylinder 120, and a motor assembly 200 that serves as a linear motor for applying a driving force to the piston 130. The shell 100 may be formed by coupling a lower shell 100a to an upper shell 100b.

The shell 100 includes a suction part 101 through which a refrigerant is introduced and a discharge part (not shown) through which the refrigerant compressed in the cylinder 120 is discharged. The refrigerant suctioned through the suction part 101 flows into the piston 130 via a suction muffler 140. The suction muffler 140 is disposed in the piston 130 to reduce noises while the refrigerant passes through the suction muffler 140.

The piston 130 may be formed of an aluminum material (aluminum or an aluminum alloy) that is a nonmagnetic material. Since the piston 130 is formed of the aluminum material, a flux generated in the motor assembly 200 may be transmitted into the piston 130 to prevent the flux from leaking to the outside of the piston 130.

The cylinder 120 may be formed of an aluminum material (aluminum or an aluminum alloy) that is a nonmagnetic material. Also, the cylinder 120 and the piston 130 may have the same material composition, i.e., the same kind and composition.

Since the piston 120 is formed of the aluminum material, the flux generated in the motor assembly 200 may be transmitted into the piston 120 to prevent the flux from leaking to the outside of the piston 120.

Also, since the piston 130 is formed of the same material (aluminum) as the cylinder 120, the piston 130 may have the same thermal expansion coefficient as the cylinder 120. When the linear compressor 10 operates, an high-temperature (a temperature of about 100° C.) environment may be created within the shell 100. Thus, since the piston 130 and the cylinder 120 have the same thermal expansion coefficient, the piston 130 and the cylinder 120 may be thermally deformed by the same degree.

As a result, the piston 130 and the cylinder 120 may be thermally deformed with sizes and in directions different from each other to prevent the piston 130 from interfering with the cylinder 120 while the piston 430 moves.

The cylinder 120 has a compression space P in which the refrigerant is compressed by the piston 130. Also, a suction hole 131 through which the refrigerant is introduced into the compression space P is defined in the piston 130, and a suction valve 132 for selectively opening the suction hole 131 is disposed outside the suction hole 133.

Discharge valve assemblies 170, 172, and 174 for discharging the refrigerant compressed in the compression space P are disposed on one side of the compression space P. That is, the compression space P may be understood as a space defined between the piston 130 and the discharge valve assemblies 170, 172, and 174.

The discharge valve assemblies 170, 172, and 174 include a discharge cover 172 defining a discharge space of the refrigerant, a discharge valve 170 that is opened when a pressure in the compression space P is above a discharge pressure to introduce the refrigerant into the discharge space, and a valve spring 174 disposed between the discharge valve 170 and the discharge cover 172 to apply an elastic force in an axis direction.

Here, the "axial direction" may be understood as a direction in which the piston 130 is reciprocated, i.e., a transverse direction in FIG. 3. On the other hand, a "radius direction" may be understood as a direction that is perpendicular to the direction in which the piston 130 is reciprocated, i.e., a horizontal direction in FIG. 3.

The suction valve 132 may be disposed on one side of the compression space P, and the discharge valve 170 maybe disposed on the other side of the compression space P, i.e., an opposite side of the suction valve 132.

While the piston 130 is linearly reciprocated within the cylinder 120, when the pressure of the compression space P is below the discharge pressure and a suction pressure, the suction valve 132 may be opened to suction the refrigerant into the compression space P. On the other hand, when the pressure of the compression space P is above the suction pressure, the suction valve 132 may compress the refrigerant of the compression space P in a state where the suction valve 135 is closed.

When the pressure of the compression space P is above the discharge pressure, the valve spring 174 may be deformed to open the discharge valve 170. Here, the refrigerant may be discharged from the compression space P into the discharge space of the discharge cover 172.

Also, the refrigerant in the discharge space is introduced into a loop pipe (not shown) via the discharge muffler 176. The discharge muffler may reduce flow noises of the compressed refrigerant, and the loop pipe may guide the compressed refrigerant into the discharge part.

The linear compressor 10 further includes a frame 110. The frame 110 may fix the cylinder 120 and be integrated with the cylinder 120 or coupled to the cylinder 120 by using a separate coupling member. Also, the discharge cover 172 may be coupled to the frame 110.

The motor assembly 200 includes an inner stator 210 fixed to the frame 110 and disposed to surround the cylinder 120, an outer stator 220 disposed to be spaced outward in a radius direction of the inner stator 210, and a permanent magnet 230 disposed in a space between the inner stator 210 and the outer stator 220.

The permanent magnet 230 may be linearly reciprocated by a mutual electromagnetic force between the outer stator 210 and the inner stator 220. Also, the permanent magnet 230 may be formed by coupling a plurality of magnets having three polarities. Alternatively, the permanent magnet 230 may be provided as a magnet having one polarity. Also, the permanent magnet 230 may be formed of a ferrite material.

The permanent magnet 230 may be coupled to the piston 130 by a connection member 138. The connection member 138 may be coupled to a flange part 133 of the piston 130 to extend from the permanent magnet 230. As the permanent magnet linearly moves, the piston 120 may be linearly reciprocated in an axis direction together with the permanent magnet 230.

Also, the linear compressor 10 further includes a fixing member 230 for fixing the permanent magnet 147 to the connection member 138. The fixing member 147 may be formed of a composition in which a glass fiber or carbon fiber is mixed with a resin. The fixing member 147 may be provided to surround the outside of the permanent magnet 230 to firmly maintain the coupled state between the permanent magnet 230 and the connection member 138.

The stator cover 240 is disposed outside the inner stator 210. The stator cover 240 is coupled to the frame 110 by the coupling member 242. The inner stator 210 may have one side supported by the frame 110 and the other side supported by the stator cover 240. That is, the inner stator 210 may be disposed between the frame 110 and the stator cover 240.

The outer stator 220 is spaced inward from the inner stator 210 by an airgap in a radius direction and is fixed to the outside of the permanent magnet 230. Also, the outside of the outer stator 220 may be supported by the frame 110.

The outer stator 220 may be formed by stacking a plurality of thin plates in a circumferential or radial direction (a lamination structure).

The linear compressor 10 further includes a support 135 for supporting the piston 130. The support 135 may be coupled to the flange part 133 of the piston 130 to extend backward and then to extend in a radius direction.

The linear compressor 10 further includes a back cover 115 extending from the piston 130 to the suction part 101.

The linear compressor 10 includes a plurality of springs 151,155 that are adjustable in natural frequency to allow the piston 130 to perform a resonant motion.

The plurality of springs 151,155 include a first spring 151 supported between the support 135 and the stator cover 240 and a second spring 155 supported between the suction muffler 140 and the back cover 115.

The first spring 151 may be provided in plurality on both sides of the cylinder 120 or the piston 130. The second spring 155 may be provided in plurality toward a rear side of the suction muffler.

Here, the "rear side" may be understood as a direction from the piston 130 toward the suction part 101. Also, a direction from the suction part 101 toward the discharge valve assemblies 170, 172, and 174 may be understood as a "front side". These terms may be equally applied to the following descriptions.

Figure 4:
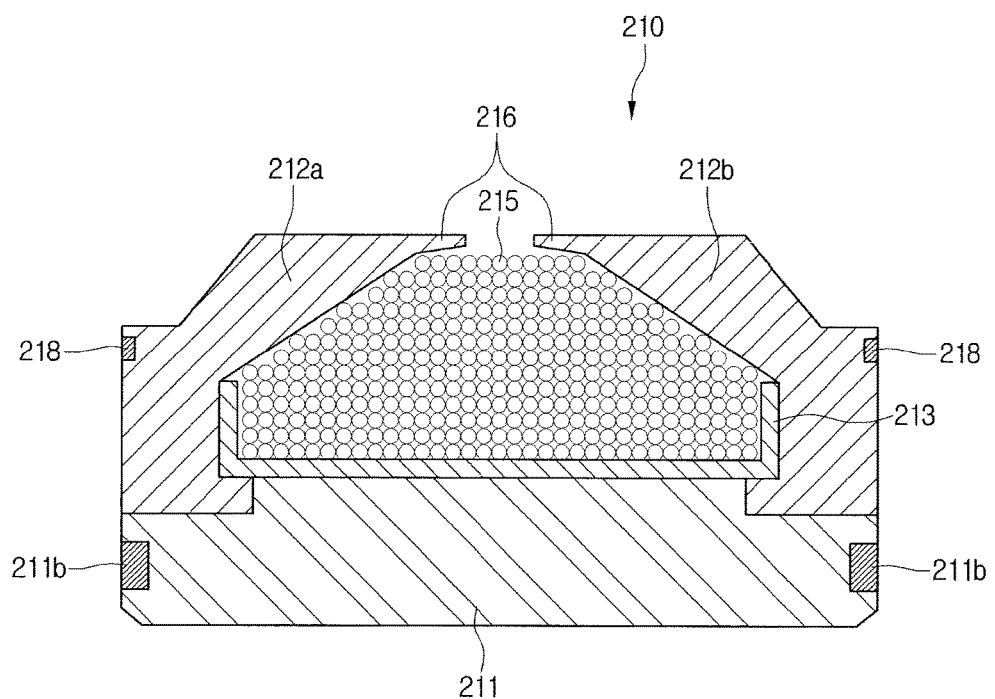
FIG. 4 is a cross-sectional view illustrating an inner stator of the linear compressor according to the first embodiment.
Figure 5:
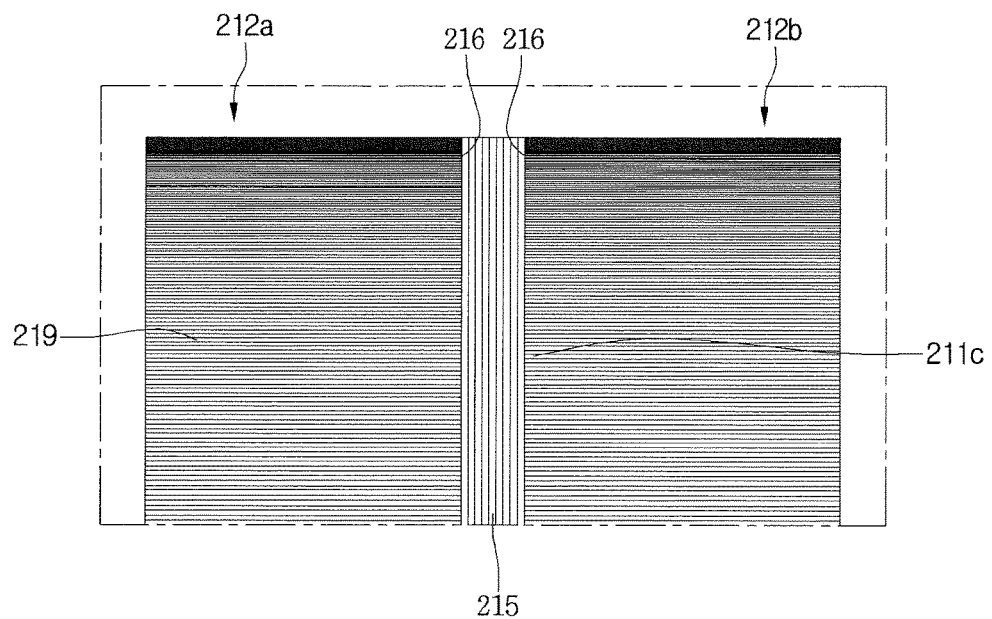
FIG. 5 is a view illustrating a side surface of the inner stator according to the first embodiment.

FIG. 4 is a cross-sectional view illustrating an inner stator of the linear compressor according to the first embodiment, and FIG. 5 is a view illustrating a side surface of the inner stator according to the first embodiment.

Referring to FIGS. 4 and 5, the inner stator 210 according to the first embodiment includes a center core 211 extending in a front/rear direction and side cores 212a and 212b coupled to the outside of the center core 211. The side cores 212a and 212b include a first side core 212a and a second side core 212b.

The center core 211 is formed by stacking a plurality of core plates 211c in a circumferential or radial direction. Each of the core plates 211c may have an approximately rectangular shape. Also, when the core plates 211c are assembled, the center core 211 may have a cylindrical shape on the whole.

The center core 211 includes a center fixing member 211b for maintaining the state in which the plurality of core plates 211c that are stacked on each other are assembled. The center fixing member 211b may be a member having an approximately ring shape and be disposed on each of front and rear surfaces of the center core 211.

The plurality of core plates 211c fixed by the center fixing member 211b may constitute the center core 211 having an approximately hollow cylindrical shape.

The first and second side cores 212a and 212b may be assembled to both sides of the center core 211.

In detail, the first side core 212a may be coupled to a rear portion of the center core 211, and the second side core 212b may be coupled to a front portion of the center core 211. Also, the first and second side cores 212a and 212b may be spaced apart from each other and be coupled to the center core 211.

The stator cover 240 may be disposed outside the first side core 212a, and the frame 110 may be disposed outside the second side core 212b. That is, the first and second side cores 212a and 212b may be supported between the stator cover 240 and the frame 110.

Each of the first and second side cores 212a and 212b may be formed by stacking the plurality of core plates 219 in a circumferential or radial direction. The core plate 219 may have a polygonal shape having a bent portion. To distinguish the core plate 219 of each of the side cores 212a and 212b from the core plate 211c of the center core 211, the core plate 219 may be called a "first core plate", and the core plate 211c may be called a "second core plate".

Also, each of the first and second side cores 212a and 212b may have an approximately annular shape. Here, the first and second side cores 212a and 212b may have shapes similar to each other.

Each of the first and second side cores 212a and 212b includes a side fixing member 218 for fixing the plurality of core plates 219 to maintain the assembled state. The side fixing member 218 may be understood as a ring member having an approximately ring shape and be disposed on each of outer surfaces of the first and second side cores 212a and 212b.

Also, the side fixing member 218 disposed on the first side core 212a may be disposed to face the stator cover 240, and the side fixing member 218 disposed on the second side core 212b may be disposed to face the frame 110.

Each of the first and second side cores 212a and 212b includes a core body 212c and a tip 216 extending from one side of the core body 212c.

The core body 212c is formed by assembling the plurality of core plates 219.

The tip 216 of the first side core 212a and the tip 216 of the second side core 212b may be disposed to face each other. The tip 216 of the first side core 212a may extend forward from an outer circumferential surface of the core body 212c, and the tip 216 of the second side core 212b may extend backward from an outer circumferential surface of the core body 212c.

The inner stator 210 further includes coil winding bodies 213 and 215. The coil winding bodies 213 and 215 include a bobbin 213 and a coil 215 wound around an outer circumferential surface of the bobbin 213. The wound coil 215 may have a polygonal shape in section. The center core 211 may be disposed to be inserted into the bobbin 213.

In detail, the bobbin 213 and the coil 215 may be disposed in a space defined by the center core 211 and the first and second side cores 212a and 212b. Also, the bobbin 213 may have a bent shape to be coupled to one surface of the center core 211 and one surface of each of the first and second side cores 212a and 212b.

A surface of the side core 212a, which is coupled to the bobbin 213 may be called an inner surface, and a surface of the side core 212a on which the side fixing member 218 is disposed may be called an outer surface. Slimily, a surface of the second side core 212b, which is coupled to the bobbin 213 may be called an inner surface, a surface of the side core 212a on which the side fixing member 218 is disposed may be called an outer surface. Thus, it may be understood that the bobbin 213 is disposed between the inner surface of the first side core 212a and the inner surface of the second side core 212b.

According to the above-described constitutions, the center core 211 and the first and second side cores 212a and 212b may be disposed to surround the coil winding bodies 213 and 215.

As illustrated in FIG. 5, when the inner stator 210 is viewed from a lateral side, the wound coil 215 may be seen between the first and second side cores 212a and 212b, i.e., between the tips 216 of the first and second side cores 212a and 212b.

Figure 6:
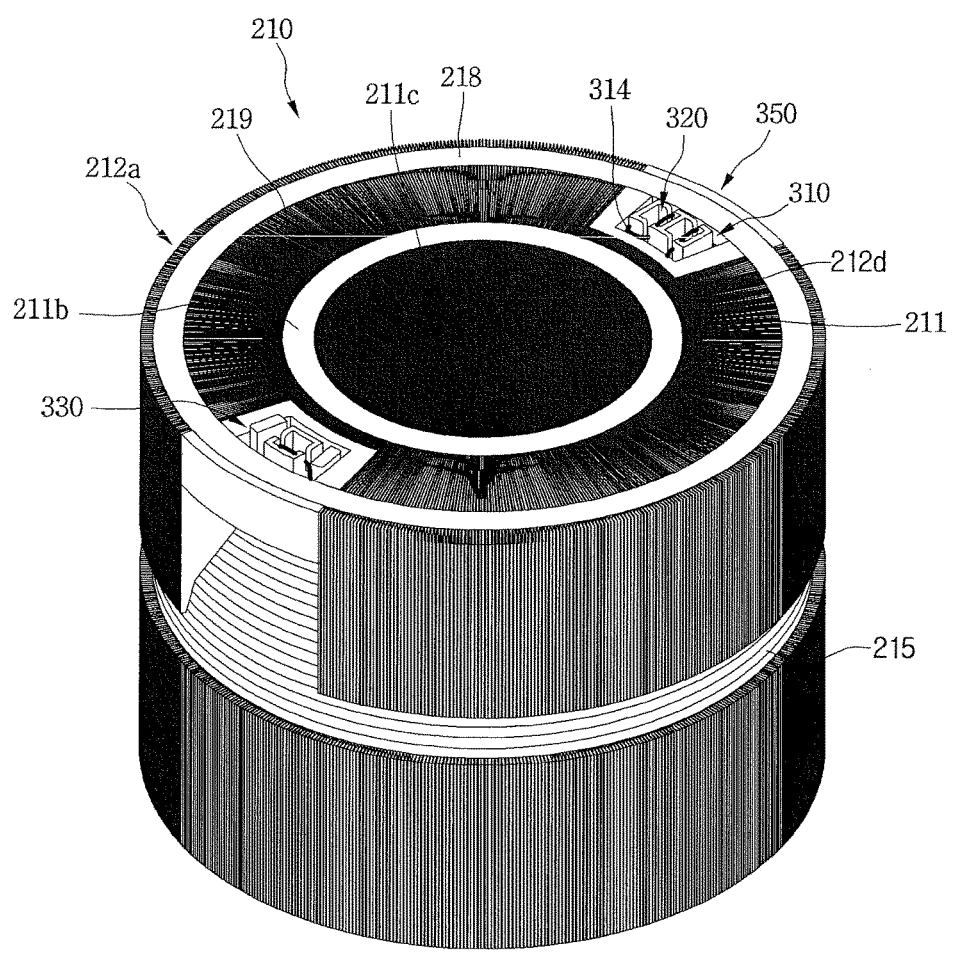
FIG. 6 is a perspective view of the inner stator according to the first embodiment.
Figure 7:
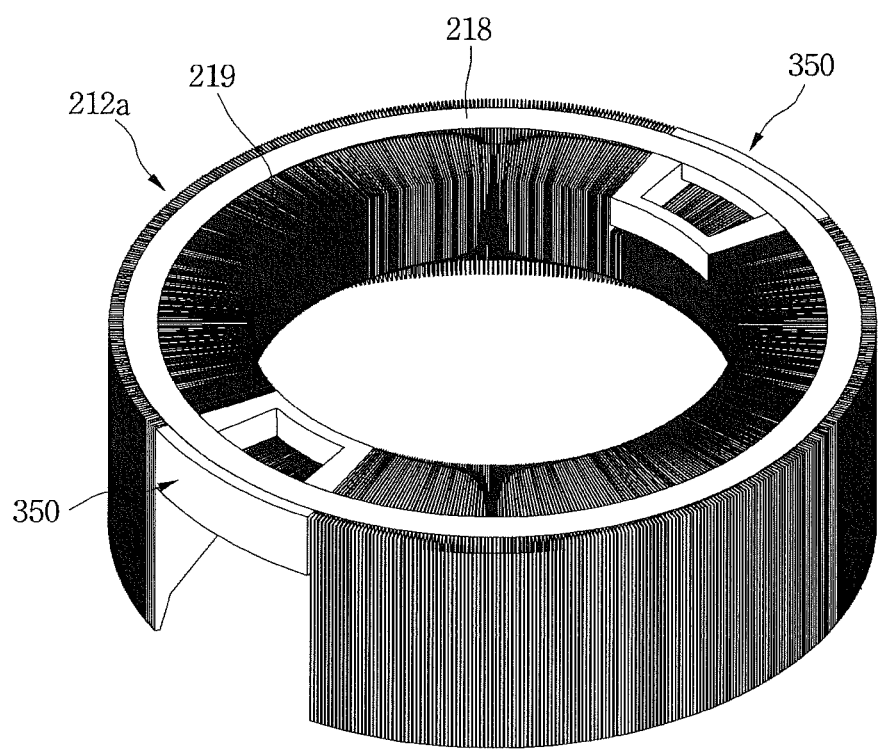
FIG. 7 is a view of a first side core according to the first embodiment.
Figure 8:
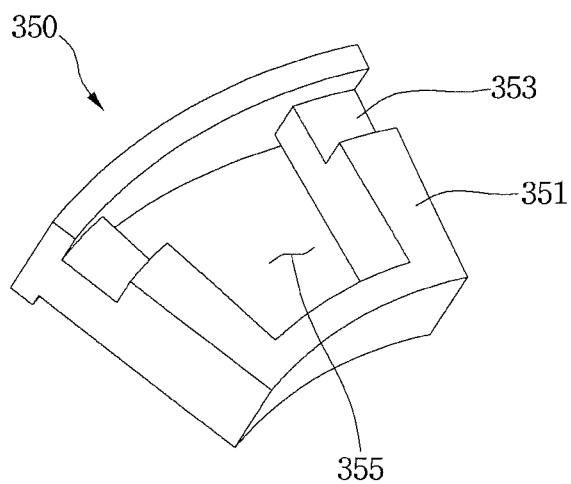
FIG. 8 is a view of a state in which a lead-out guide device and a side fixing member are coupled to each other according to the first embodiment.
Figure 9:
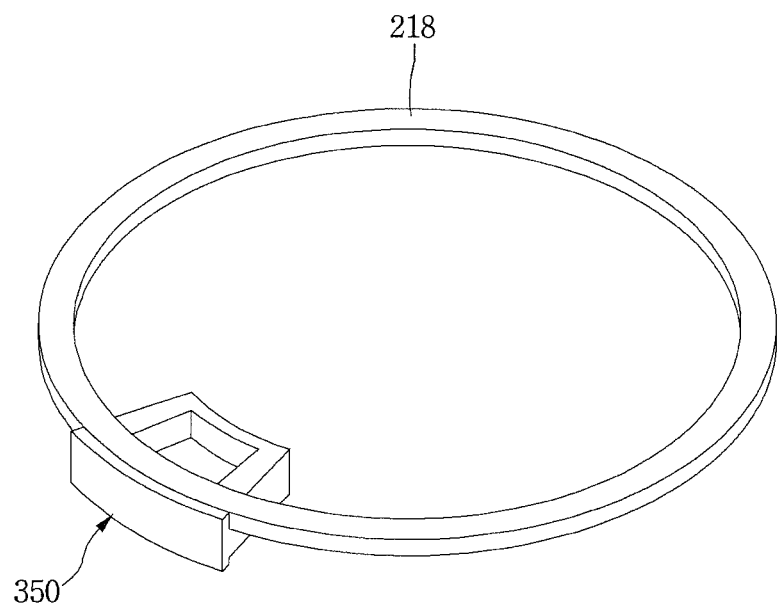
FIG. 9 is a view of the lead-out guide device according to the first embodiment.
Figure 10:
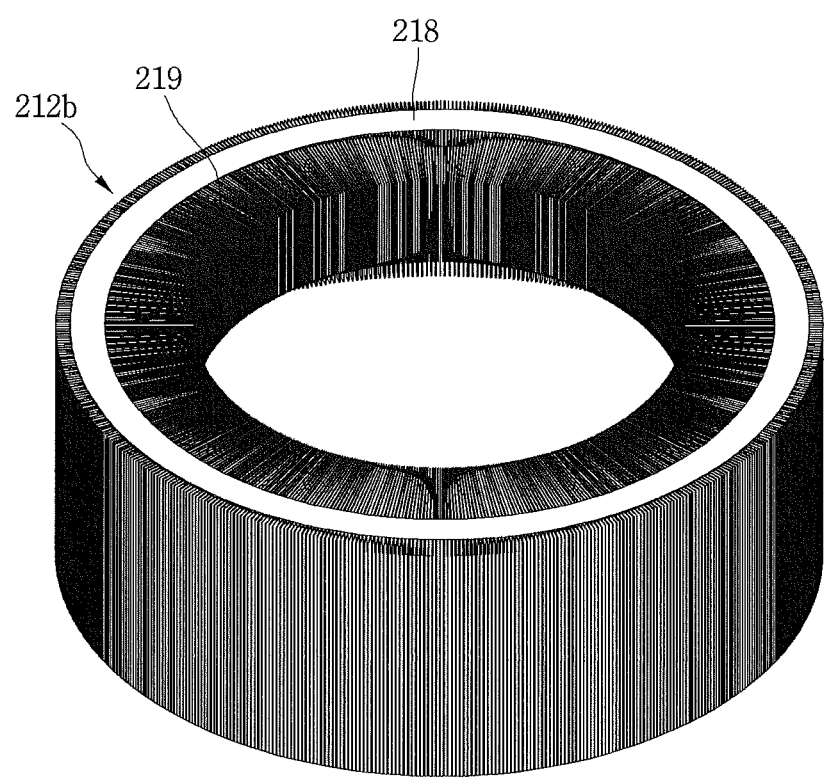
FIG. 10 is a view of a second side core according to the first embodiment.

FIG. 6 is a perspective view of the inner stator according to the first embodiment, FIG. 7 is a view of a first side core according to the first embodiment, FIG. 8 is a view of a state in which a lead-out guide device and a side fixing member are coupled to each other according to the first embodiment, FIG. 9 is a view of the lead-out guide device according to the first embodiment, and FIG. 10 is a view of a second side core according to the first embodiment.

Referring to FIGS. 6 to 10, the inner stator 210 according to the first embodiment includes the center core 211 having the approximately cylindrical shape, a first side core 212a coupled to one side of the center core 211, and a second side core 212b coupled to the other side of the center core 211. In FIG. 6, the first side core 212s may be coupled to an upper portion of the center core 211, and the second side core 212b may be coupled to a lower portion of the center core 211.

The center core 211 includes a plurality of core plate 211c and a center fixing member 211b coupled to one surfaces of the plurality of core plates 211c to fix the plurality of core plates 211c.

The first side core 212a includes the core body 212c constituted by the plurality of core plates 219, the side fixing member 218 coupled to one surfaces of the plurality of core plates 219 to fix the plurality of core plates 219, and at least one lead-out guide device 350 coupled to the core body 212c.

The core body 212c includes a guide coupling part 212d to which the lead-out device 350 is coupled. The guide coupling part 212d may be understood as a space between a portion of the plurality of core plates 219 and the rest core plates. Thus, the guide coupling part 212d may have a shape corresponding to that of the lead-out guide device 350. For example, the lead-out device 350 may be inserted into the guide coupling part 212d.

The lead-out guide device 350 may be understood as a device for guiding the terminal parts 310, 320, and 330 disposed on the bobbin 213 to expose or lead out the terminal parts 310, 320, and 330.

The lead-out guide device 350 includes a guide body 351 including a terminal insertion part 355 and a seat part 353 that is defined by recessing at least a portion of the guide body 351 and on which the side fixing member 218 is seated.

At least a portion of the guide body 351 may be penetrated to form the terminal insertion part 355. Also, since the seat part 353 is recessed from one surface of the guide body 351, when the side fixing member 218 is seated on the seat part 353, one surface of the lead-out guide device 350 and one surface of the core body 212c may be approximately the same. Also, the lead-out guide device 350 may be firmly coupled to the core body 212c.

The lead-out guide device 350 may be provided as a magnetic body manufactured by using power metallurgy or powder sintering. In detail, pure iron may be insulation-applied, thermally treated, and compressed to form the lead-out guide device 350. The lead-out guide device 350 formed of the above-described material and by using the above-described method may have a property that allows flux to pass therethrough.

The lead-out guide device 350 may be provided in plurality. The plurality of lead-out guide devices 350 may be disposed at sides opposite to each other to correspond to positions of the first and second terminal parts 310 and 320 and the third terminal part 330.

The second side core 212b includes a core body 212c constituted by a plurality of core plates 219 and a side fixing member 218 coupled to one surfaces of the plurality of core plates 219 to fix the plurality of core plates 219.

When compared to the first side core 212a, the second side core 212b may not be coupled to the lead-out guide device 350.

Since the terminal parts 310, 320, and 330 of the bobbin 213 protrude toward the first side core 212a, the lead-out guide device 350 for guiding the lead-out or exposure of the terminal parts 310, 320, and 330 is provided in the first side core 212a. However, the lead-out guide device 350 may not be provided in the second side core 212b.

Figure 11:
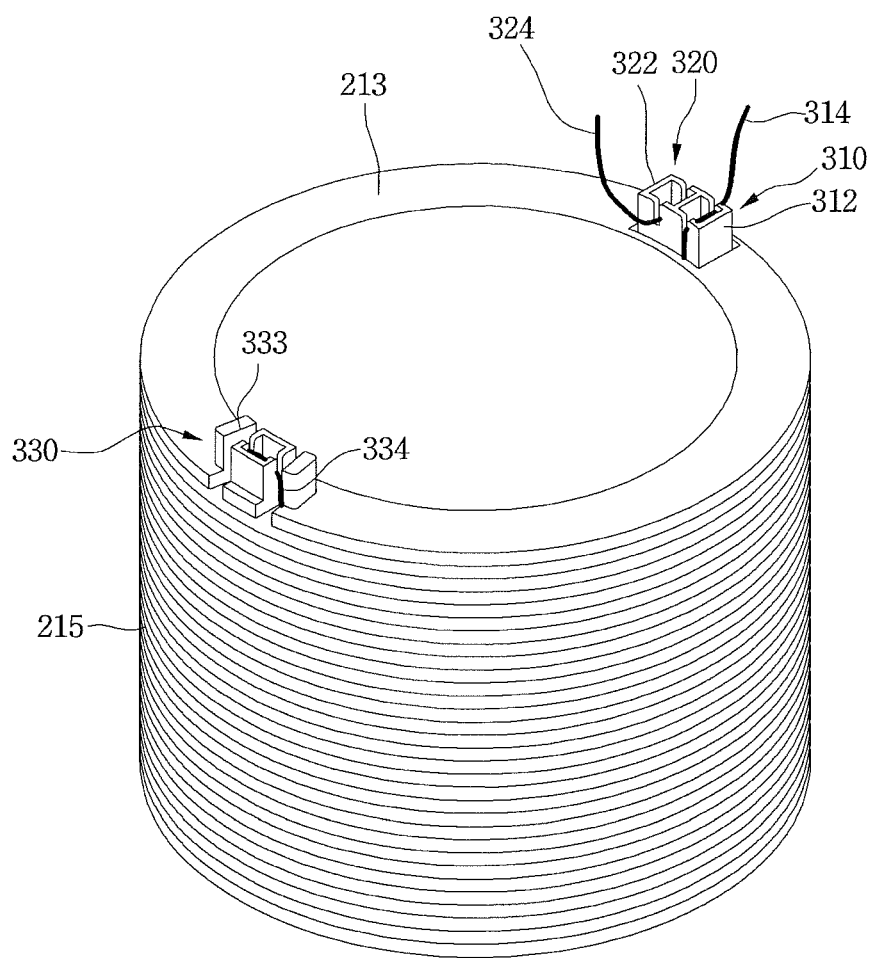
FIG. 11 is a view of a coil assembly according to the first embodiment.

FIG. 11 is a view of a coil assembly according to the first embodiment.

Referring to FIG. 11, the coil assemblies 213 and 215 according to the first embodiment include the bobbin 213 including the plurality of terminal parts 310, 320, and 330 for applying power and a coil 215 wound around the bobbin 213.

The bobbin 213 includes a bobbin body 213a around which the coil 215 is wound and a terminal installation part 213b disposed on one side of the bobbin body 213a and on which the plurality of terminal parts 310, 320, and 330 are disposed.

The bobbin body 213 has an approximately cylindrical shape, and the coil 215 is wound around an outer surface of the bobbin body 213. The terminal installation part 213b protrudes from the bobbin body 213a and has one surface on which the plurality of terminal parts 310, 320, and 330 are disposed.

The plurality of terminal parts 310, 320, and 330 include a first terminal part 310, a second terminal part 320, and a third terminal part 330.

Each of the terminal parts 310, 320, and 330 includes a power line and a terminal block for fixing the power line.

The first terminal part 310 includes a first terminal block 312 for fixing at least a portion of the coil 215 wound around the bobbin body 213a. At least a portion of the coil 215 constitutes a first power line 314 through which power is supplied into the linear motor.

The first power line 314 may be coupled to the first terminal block 312 and then exposed or led out to the outside. For example, the first terminal part 310 constitutes a common terminal.

The second terminal part 320 includes a second terminal block 322 for fixing at least a portion of the coil 215 wound around the bobbin body 213a. At least a portion of the coil 215 constitutes a second power line 324 through which power is supplied into the linear motor.

The second power line 324 may be coupled to the second terminal block 322 and then exposed or led out to the outside. For example, the second terminal part 320 constitutes a terminal that supplies power for generating a low output.

Also, the third terminal part 330 includes a third terminal block 332 for fixing at least a portion of the coil 215 wound around the bobbin body 213a. At least a portion of the coil 215 constitutes a third power line 334 through which power is supplied into the linear motor.

The third power line 334 may be coupled to the third terminal block 332 and then exposed or led out to the outside. For example, the third terminal part 330 constitutes a terminal that supplies power for generating a high output.

The first terminal block 312 and the second terminal block 332 may be coupled to each other or integrated with each other. Also, the third terminal block 332 may be disposed at sides opposite to each other with respect to a center of the bobbin 213 of each of the first and second terminal blocks 312 and 322.

Since the first and second terminal blocks 312 and 322 and the third terminal block 332 are disposed at positions opposite to each other, a phenomenon in which the center core 211 receives an eccentric force by the flux generated when the linear motor operates and thus is based in one direction may be prevented.

Although not shown, a magmate for connecting the first to third power lines to each other may be coupled to the first to third terminal parts 310, 320, and 330. When the magmate is coupled, outer shells of the first to third power lines may be taken off, and thus, the first to third power lines may be conductive.

When the first side core 212a is coupled to one side of the bobbin 213, the first and second terminal blocks 310 and 320 and the third terminal block 330 may be disposed within the terminal insertion part 355 of the lead-out guide device 350. Thus, the first to third power lines 314, 324, and 334 may be led out or exposed to the outside. As a result, the first to third power lines 314, 324, and 334 may be easily connected to a power supply part or power supply line.

Hereinafter, descriptions will be made according to a second embodiment. Since the current embodiment is the same as the first embodiment except for portions of the constitutions, different parts between the first and second embodiments will be described principally, and descriptions of the same parts will be denoted by the same reference numerals and descriptions of the first embodiment.

Figure 12:
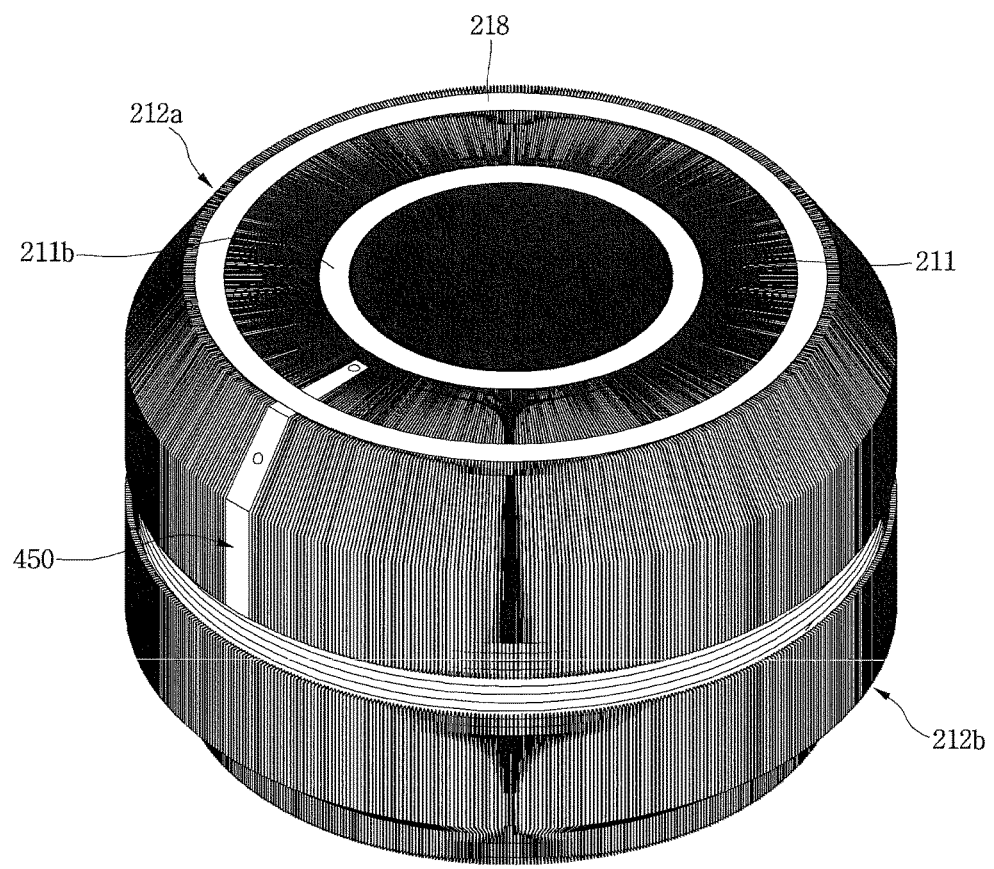
FIG. 12 is a perspective view of an inner stator according to a second embodiment.
Figure 13:
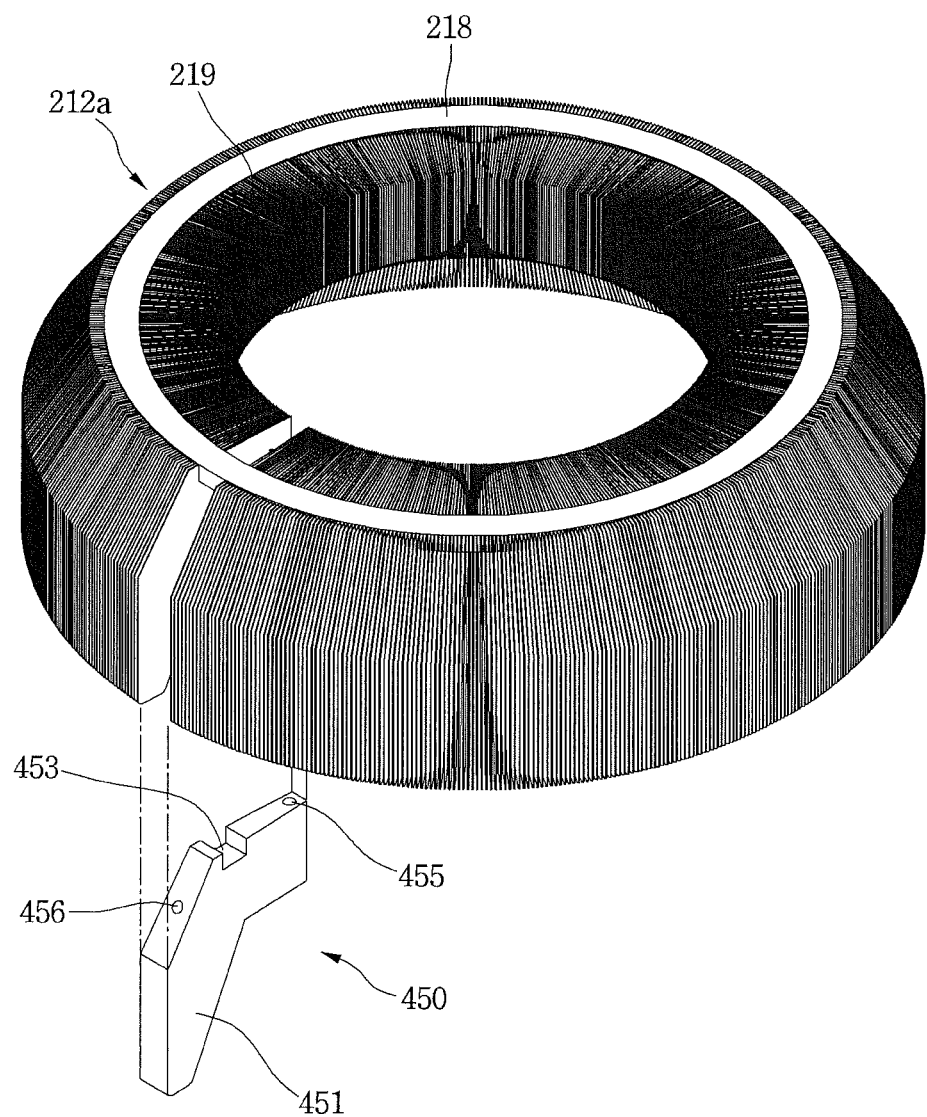
FIG. 13 is an exploded perspective view of a first side core and a lead-out guide device according to the second embodiment.

FIG. 12 is a perspective view of an inner stator according to a second embodiment, and FIG. 13 is an exploded perspective view of a first side core and a lead-out guide device according to the second embodiment.

Referring to FIGS. 12 and 13, an inner stator 410 according to a second embodiment includes a center core 411 extending in a front/rear direction and side cores 412a and 412b coupled to the outside of the center core 411. The side cores 412a and 412b include a first side core 412a and a second side core 412b.

The center core 411 includes a plurality of core plates 411c that are stacked in a circumferential or radius direction and a center fixing member 411b for maintaining the state in which the plurality of core plates 411c that are stacked on each other are assembled. The center fixing member 411b may be a member having an approximately ring shape and be disposed on each of front and rear surfaces of the center core 411.

The plurality of core plates 411c fixed by the center fixing member 411b may constitute the center core 411 having an approximately hollow cylindrical shape.

The first and second side cores 412a and 412b may be assembled to both sides of the center core 411.

In detail, the first side core 412a may be coupled to a rear portion of the center core 411, and the second side core 412b may be coupled to a front portion of the center core 412.

Each of the first and second side cores 412a and 412b may be formed by stacking a plurality of core plates 419 in a circumferential or radial direction. The core plate 419 may have a polygonal shape having a bent portion.

Each of the first and second side cores 412a and 412b includes a side fixing member 419 for fixing the plurality of core plates 419 to maintain the assembled state. The side fixing member 418 may be understood as a ring member having an approximately ring shape and be disposed on each of outer surfaces of the first and second side cores 412a and 412b.

The plurality of fixed core plates may constitute a core body.

The inner stator 410 includes the bobbin and the coil 415 wound around the bobbin, which are described according to the first embodiment.

The first side core 412a further includes a lead-out guide device 450 for leading out or exposing at least a portion of the coil 415 to the outside.

The lead-out guide device 450 may be inserted into a space part defined between the plurality of core plates 419. In detail, the core body may include a guide coupling part 412d into which the lead-out guide device 450 is inserted. The guide coupling part 412d may have a shape in which at least a portion of the annular core body is cut.

The lead-out guide device 450 includes a guide body 451 coupled to the guide coupling part 412d and a seat part 453 defined in the guide body 451 and on which the side fixing member 418 is seated.

At least one lead-out hole through which at least a portion of the guide body 451 passes may be defined in the lead-out guide device 450. In detail, the lead-out hole includes a first lead-out hole 455 and a second lead-out hole 456. For example, the first and second lead-out holes 455 and 456 may be defined in both sides of the seat part 453.

The lead-out guide device 450 may be formed of a nonconductive material.

A power line 414 may be led out through the first and second lead-out holes 455 and 456. The power line 414 may be coated with an insulation material.

According to the above-described structure, at least a portion of the coil 415 may constitute the power line 414 and be exposed or led out to the outside through the lead-out guide device 450, and thus, be easily connected to the power supply line.

According to the embodiment, when the liner motor is provided as the inner winding type, the power line provided in the coil assembly may be easily led out or exposed to the outside through the lead-out guide device.

Also, since the lead-out guide device is assembled with the side core that is formed by stacking the plurality of core plates, the lead-out guide device may be easily coupled through the simple structure.

Particularly, since the lead-out guide device is assembled with the side core by the side fixing member for fixing the plurality of core plates, a separate device for assembling the lead-out guide device may not be required.

Also, since the lead-out guide device is formed by using pure iron powder through powder metallurgy method, a flow of the flux may be improved, and the motor may increase in efficiency.

Also, since the lead-out guide device is formed of a nonconductive material such as a plastic material, and the power line is coated with an insulation material, the insulation with respect to the coil assembly or the power line may be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor comprising:
   a cylinder defining a compression space;
   a piston configured to reciprocate in an axis direction within the compression space defined by the cylinder; and
   a linear motor configured to provide power to the piston, wherein the linear motor comprises:
      an inner stator disposed outside of the compression space defined by the cylinder, the inner stator comprising a center core and a side core disposed on at least one side of the center core;
      an outer stator that is spaced outward from the inner stator in a radius direction; and
      a magnet disposed in an airgap defined between the inner stator and the outer stator, the magnet being configured to move within the airgap defined between the inner stator and the outer stator and reciprocate the piston based on movement of the magnet,
   wherein the side core of the inner stator comprises:
      a core body,
      a guide device that is coupled to the core body and that is configured to expose or lead out a power line to an outside of the side core,
      a plurality of core plates that are stacked on each other, and
      a side fixing member configured to fix the plurality of core plates, and
   wherein the guide device comprises:
      a guide body inserted into the core body, and
      a seat part that is defined in the guide body and that is configured to serve as a seat for the side fixing member.

2. The linear compressor according to claim 1, wherein a surface of the guide body is recessed to define the seat part.

3. The linear compressor according to claim 1, wherein the inner stator further comprises:
   a bobbin comprising a terminal part; and
   a coil wound around the bobbin,
   wherein at least a portion of the coil is coupled to the terminal part and defines the power line that is exposed or led out by the guide device.

4. The linear compressor according to claim 3, comprising a plurality of guide devices.

5. The linear compressor according to claim 4, wherein the terminal part of the bobbin comprises:
   first and second terminal parts, each of which is inserted into a first of the plurality of guide devices; and
   a third terminal part inserted into a second of the plurality of guide devices that is different than the first of the plurality of guide devices.

6. The linear compressor according to claim 5, wherein the first and second terminal parts are disposed on a surface of the bobbin, and
   the third terminal part is disposed on a side opposite to the first and second terminal parts on the surface of the bobbin.

7. The linear compressor according to claim 3, wherein the center core is inserted into the bobbin.

8. The linear compressor according to claim 1, wherein the guide device comprises a magnetic body manufactured by using power metallurgy or powder sintering.

9. The linear compressor according to claim 8, wherein the magnetic body is comprised of pure iron powder that is insulation-applied and compressed.

10. The linear compressor according to claim 8, wherein the guide device comprises a nonconductive material.

11. The linear compressor according to claim 1, wherein the power line is coated with an insulation material.

12. The linear compressor according to claim 1, wherein the cylinder defines a compression space configured to receive and compress a refrigerant.

13. The linear compressor according to claim 1, wherein the piston is configured to reciprocate in an axis direction within the cylinder.

14. The linear compressor according to claim 1, wherein the inner stator is disposed outside of the cylinder.

15. A linear compressor comprising:
a cylinder defining a compression space;
a piston configured to reciprocate in an axis direction within the compression space defined by the cylinder; and
a linear motor configured to provide power to the piston, wherein the linear motor comprises:
an inner stator disposed outside of the compression space defined by the cylinder, the inner stator comprising a center core, a side core disposed on at least one side of the center core, a bobbin comprising a terminal part, and a coil wound around the bobbin, at least a portion of the coil being coupled to the terminal part and defining a power line,
an outer stator that is spaced outward from the inner stator in a radius direction, and
a magnet disposed in an airgap defined between the inner stator and the outer stator, the magnet being configured to move within the airgap defined between the inner stator and the outer stator and reciprocate the piston based on movement of the magnet, and
wherein the side core of the inner stator comprises:
a core body, and
a guide device that is coupled to the core body and that is configured to expose or lead out the power line to an outside of the side core, the guide device comprising a guide body having a terminal insertion part configured to receive the terminal part.

16. The linear compressor according to claim 15, wherein at least a portion of the guide body defines the terminal insertion part based on penetration of the guide body.

17. A linear compressor comprising:
a cylinder defining a compression space;
a piston configured to reciprocate in an axis direction within the compression space defined by the cylinder; and
a linear motor configured to provide power to the piston, wherein the linear motor comprises:
an inner stator disposed outside of the compression space defined by the cylinder, the inner stator comprising a center core, a side core disposed on at least one side of the center core, a bobbin comprising a terminal part, and a coil wound around the bobbin, at least a portion of the coil being coupled to the terminal part and defining a power line,
an outer stator that is spaced outward from the inner stator in a radius direction, and
a magnet disposed in an airgap defined between the inner stator and the outer stator, the magnet being configured to move within the airgap defined between the inner stator and the outer stator and reciprocate the piston based on movement of the magnet,
wherein the side core of the inner stator comprises:
a first side core coupled to a first side of the center core, and
a second side core coupled to a second side of the center core and spaced apart from the first side core, and
wherein each of the first and second side cores comprises a core body, and
wherein the first side core comprises a guide device that is coupled to the core body and that is configured to expose or lead out the power line to an outside of the side core.

18. The linear compressor according to claim 17, wherein the terminal part of the bobbin protrudes toward the first side core, and the guide device is disposed on the first side core.

* * * * *